United States Patent [19]

Wada

[11] Patent Number: 5,004,080
[45] Date of Patent: Apr. 2, 1991

[54] CONTROLLING CIRCUIT FOR ACTUATOR

[75] Inventor: Shunichi Wada, Himeji, Japan

[73] Assignee: Mitsubishi Denki Kabushiki Kaisha, Tokyo, Japan

[21] Appl. No.: 506,419

[22] Filed: Apr. 9, 1990

[30] Foreign Application Priority Data

Apr. 21, 1989 [JP] Japan .................................. 1-102717

[51] Int. Cl.$^5$ ................................................ F16F 9/46
[52] U.S. Cl. .................................... 188/299; 280/707; 364/424.05
[58] Field of Search ................. 188/299, 267; 280/707, 280/714; 335/138, 225, 229; 364/424.05; 318/254, 696; 310/93; 267/64.11; 180/41; 251/129.11

[56] References Cited

U.S. PATENT DOCUMENTS 4,526,401 9/1985 Kakizaki et al. .
4,624,477 11/1986 Kumagai et al. ..................... 280/707
4,776,437 10/1988 Ishibashi et al. ..................... 188/299
4,965,878 10/1990 Yamagiwa et al. ............. 364/424.05

FOREIGN PATENT DOCUMENTS 131576 8/1988 Japan .

Primary Examiner—Douglas C. Butler
Attorney, Agent, or Firm—Sughrue, Mion, Zinn, Macpeak and Seas

[57] ABSTRACT

A controlling circuit for an actuator which is provided with a change-over switch for selecting a desired rotational position of a rotating shaft of the actuator, exciting circuit forming device for selectively magnetizing a plurality of electro-magnets in order to control rotation of the rotating shaft to be in a selected desired rotational position in response to an outputted change-over signal, and electrifying switching device for supplying electricity to the electro-magnets only for a predetermined duration from the time when selection of the rotational position of the rotating shaft is changed over by the change-over switch, wherein there is no generated any unnecessary heat for the actuator and construction of the circuit can be more simplified.

10 Claims, 6 Drawing Sheets

CONTROLLING CIRCUIT FOR ACTUATOR

BACKGROUND OF THE INVENTION

1. Field of the Invention

The present invention relates to a controlling circuit for actuator, and more particularly it relates to a controlling circuit for actuator which rotates a rotor having a permenent magnet by a stator having an electro-magnet so as to change over, for example, an oil-passage area of a hydraulic shock absorber of a damping force adjustable type suspension system.

2. Description of Related Art

As a controlling circuit for actuator, such as an actuator and a controlling circuit for the actuator which adjust the rotational position of a shaft for changing over an oil-passage area in a damping force adjustable hydraulic shock absorber for vehicle are known in Japanese Utility Model Application Laid-Open No. 63-131576(1988) and the like.

The actuator and its controlling circuit disclosed in the Japanese Utility Model Application Laid-Open No. 63-131576 (1988) are "provided with a casing, an output shaft rotatably mounted in said casing, a rotor with a main permanent magnet fixed to a periphery of said output shaft, a stator with a plurality of electro-magnets fixed in spaced apart relation with each other in the circumferential direction thereof in said casing, and exciting circuit forming means for allowing to generate a repulsive magnetic field of the main permanent magnet in at least an electro-magnet which is opposite to the main permanent magnet in the plurality of electro-magnets and for selectively magnetizing a suction magnetic field of the main permanent magnet in an electro-magnet which is in a position ahead of the main permenent magnet to be rotated when said rotor is driven, wherein a sub permanent magnet for generating resiliency in the rotating direction of the rotor is arranged, in both sides of the circumferential direction of said main permanent magnet, between said selectively magnetized electro-magnets whose direction of magnetic fields are set to be opposite to that of the main permanent magnet".

This type of actuator, which is provided with a rotating shaft rotatably mounted in a casing, a rotor having a permanent magnet fixed in a periphery of the rotating shaft, and a stator having a plurality of electro-magnets, rotates the rotating shaft fixed to a change-over shaft of the shock absorber so as to stop it at a desired rotational position by selectively magnetizing the plurality of electro-magnets.

In such a controlling circuit for actuator of prior art as mentioned above, it has been thought that it is necessary to change over a plurality of switches in a complicated manner and that generally it is indispensable to employ an electronic switch to be switched by to a predetermined controlling logic and the controlling logic itself.

As such a controlling circuit for actuator as mentioned above, there is another arrangement that a controlling circuit as mentioned above is constructed with a plurality of mechanical switches only, by which the rotating shaft changed over to a predetermined angle position. In this arrangement, however, the electro-magnets are always to be electrified as long as an ignition swtich is ON, then, there exists a problem that unnecessary heat for the actuator are generated. In order to avoid this generated unnecessary heat for the actuator, it can be thought to provide in the actuator a mechanism for opening/closing said mechanical switches in cooperation with rotation of the actuator, however, effectively it is mechanically difficult to provide such a mechanism and there should occur a problem in durability of mechanical contact point.

SUMMARY OF THE INVENTION

The foregoing problems are solved in accordance with the present invention, and it is an object of the present invention to provide a controlling circuit for actuator which can operate an actuator at a higher speed with greater accuracy by simple construction and can prevent generation of heat in the actuator by stopping electrifying the actuator when its operation is stopped.

The controlling circuit for actuator in accordance with the present invention is provided with a change-over switch which selects a desired rotational position of a rotating shaft of the actuator, exciting circuit forming means for selectively magnetizing an electro-magnet so that the rotating shaft can be controlled to be in a desired rotational position being selected in response to an output signal from the change-over switch, and electrifying switching means, at the exciting circuit forming means, for supplying electricity to the electro-magnets only for a predetermined duration from the time when selection of rotational position is switched by the change-over switch and then for stopping the electric supply.

In this invention, when the selection of rotational position is changed over by the change-over switch, electric supply to a coil terminal of a predetermined electro-magnet is started through its corresponding exciting circuit forming means, and then, the electric supply is stopped by operation of electrifying switching means after a predetermined duration since the selection has been changed over. And when electric supply is started in the selected electro-magnet, a magnetic field is generated, and, then, a rotating torque is generated by the suction and resiliency between the magnetic poles of the electro-magnet and permanent magnet, so that the rotor rotated. And the rotating shaft is rotated in cooperation with the rotor and stopped at a predetermined rotational position.

The above and further objects and features of the invention will more fully be apparent from the following detailed description with accompanying drawings.

DESCRIPTION OF THE PREFERRED EMBODIMENTS

Now will be described below an embodiment of the present invention in detail with reference to the accompanying drawings.

Figure 1:
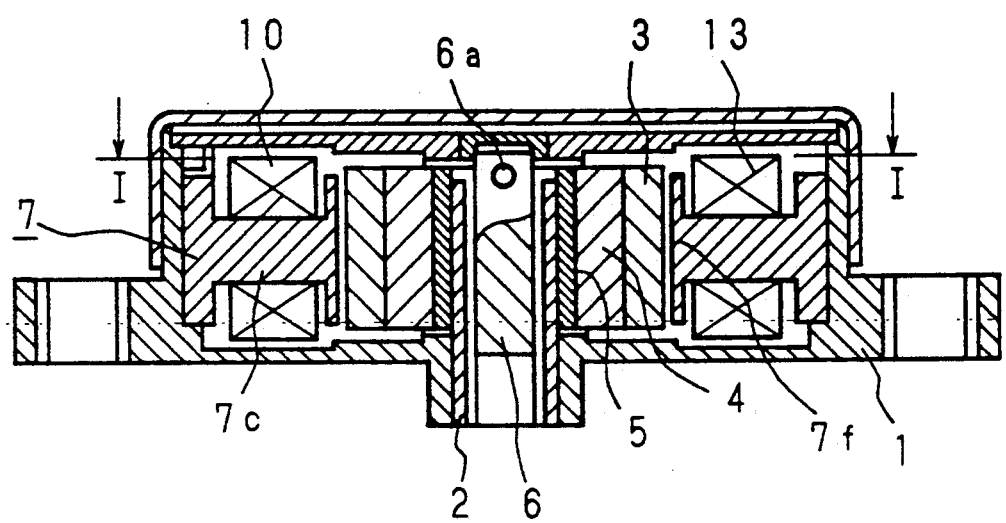
FIG. 1 is a longitudinal sectional view of an actuator being controlled by a controlling circuit in accordance with the present invention.
Figure 2:
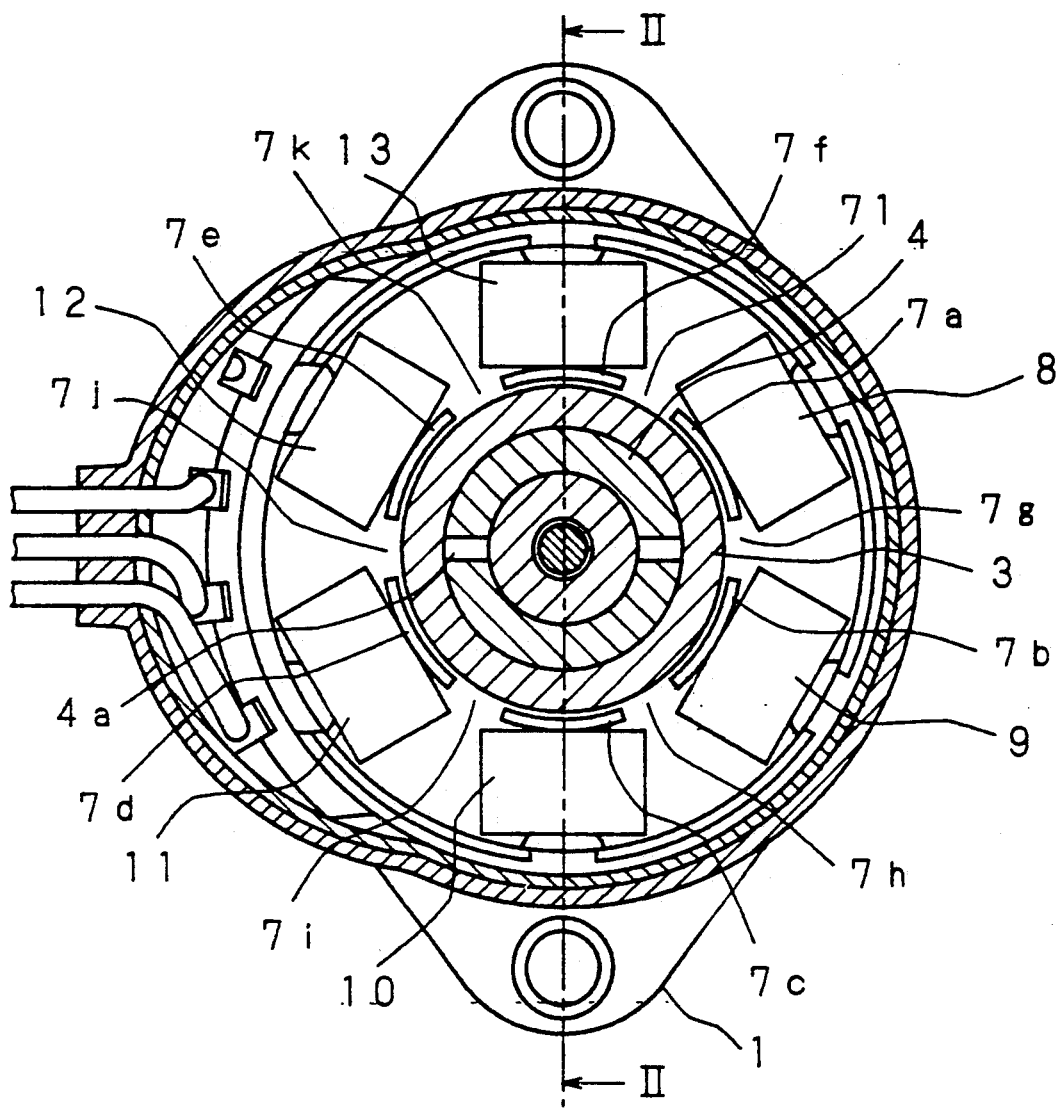
FIG. 2 is a plan sectional view of the actuator in FIG. 1 across line I—I.

FIG. 1 is a longitudinal sectional view showing construction of an actuator for adjusting rotation of a change-over shaft in a damping force adjustable hydraulic shock absorber, and FIG. 2 is a plan sectional view of the actuator in FIG. 1 across line I—I. A sectional view of the actuator in FIG. 2 across line II—II is FIG. 1.

There is fixed a hollow fixing shaft 2 in the center of a housing 1 of the actuator, and a yoke 4 for holding a permanent magnet 3 being magnetized to be pair of double pole (four poles) is rotatably supported by fixing to a bearing 5 in a periphery of the fixing shaft 2. A rotor of the actuator is constructed of such elements as the permanent magnet 3, yoke 4, and bearing 5.

There is provided a rotating shaft 6 which passes through a hollow portion of the fixing shaft 2 with a predetermined space to the inner surface of the fixing shaft 2. A pin 6a being fixed to the end of the rotating shaft 6 is engaged with a groove 4a being formed in the radial direction in the end surface of the yoke 4 so as to be connected with the yoke 4.

Figure 3:
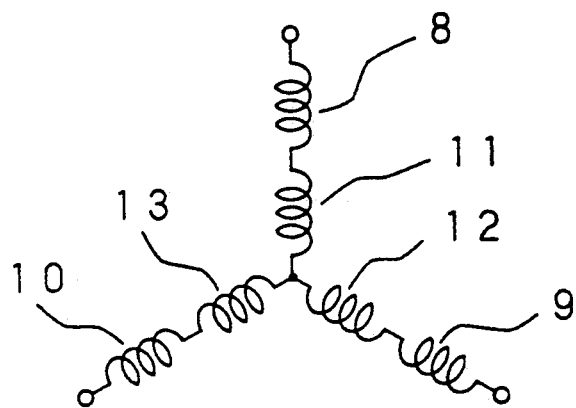
FIG. 3 is a circuit diagram showing connection of electro-magnet oils of the actuator.

In the housing 1, there is fixed a stator 7 to be radially spaced apart from the periphery of the permanent magnet 3. In the stator 7, there are formed six salient pole portions 7a, 7b, 7c, 7d, 7e and 7f being spaced apart with each other in the circumferential direction thereof and clearance portions between those salient pole portions being designated as openings 7g, 7h, 7i, 7j, 7k and 7l, and first through sixth coils 8, 9, 10, 11, 12, and 13 are coiled up around each of those salient pole portions 7a through 7f, respectively to construct six electro-magnets. Each of those coils 8 through 13 are connected in series to each other, as shown in FIG. 3, so that the first coil 8 being coiled up around the first salient pole portion 7a and the fourth coil 11 being coiled up around the fourth salient pole portion 7d being positioned to face the first salient pole portion can be connected in series to each other, and so can be the other coils as follows: second coil 9 and the fifth coil 12 being coiled up around the second salient pole portion 7b and the fifth salient pole portion 7e, the third coil 10 and the sixth coil 13 being coiled up around the third salient pole portion 7c and the sixth salient pole portion 7f, respectively.

Figure 4:
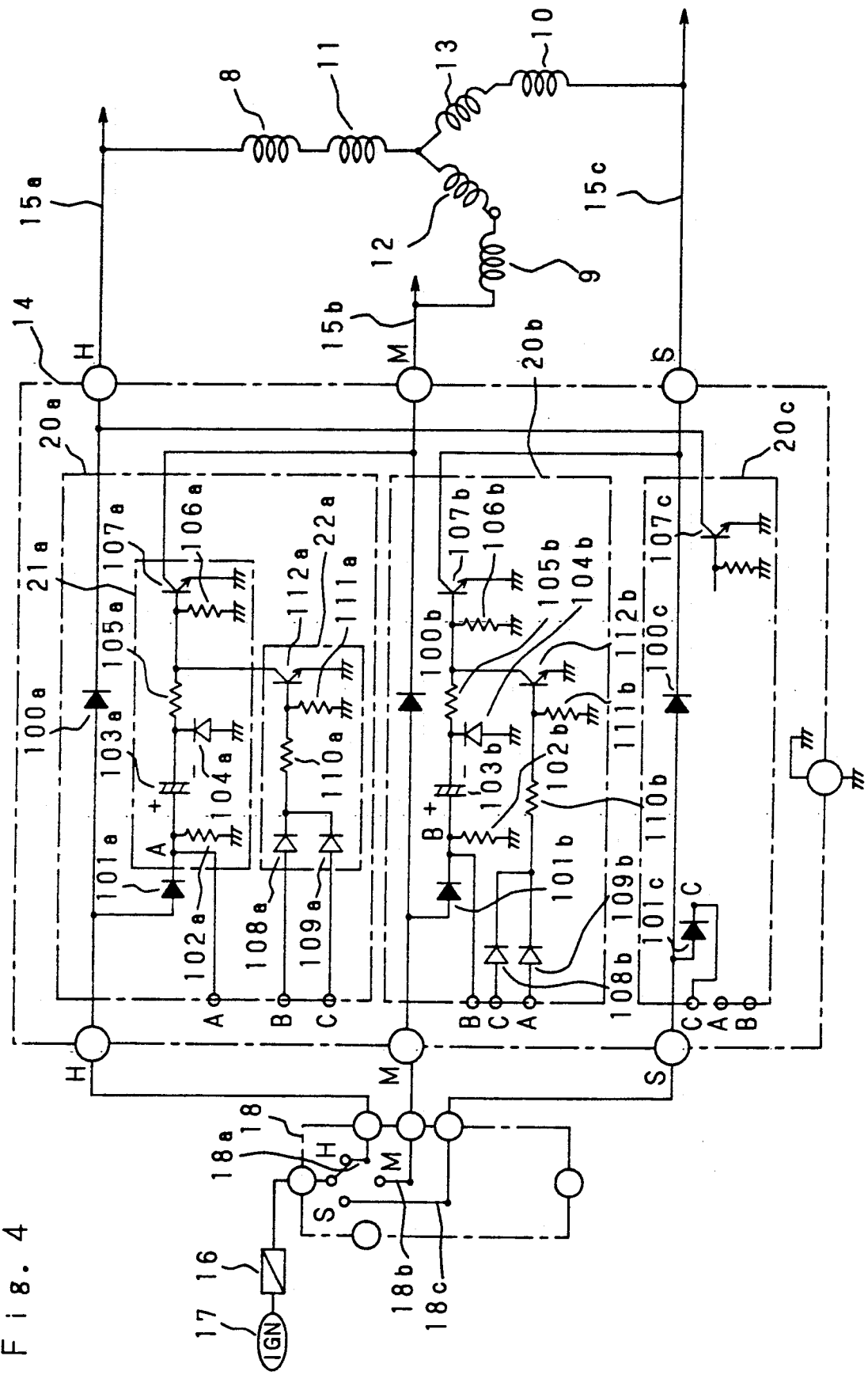
FIG. 4 is a circuit diagram showing construction of a controlling circuit in accordance with the present invention.

FIG. 4 is circuit diagram showing the controlling circuit of the present invention. There is provided an exciting circuit change-over circuit 14 which controls electric supply to each of the first, second and third coil terminals, 15a, 15b and 15c as terminals of each of the first, second and third coils 8, 9 and 10. The exciting circuit change-over circuit 14 is connected through a change-over switch 18, a fuse 16 and an ignition switch 17 to a power source battery.

The change-over switch 18 is comprised of switching elements 18a, 18b and 18c for selecting rotational position of the rotating shaft 6 in order to change over the damping force of the hydraulic shock absorber into each of a hard mode (H), a medium mode (M) and a soft mode (S). The exciting circuit change-over circuit 14 is comprised of three exciting circuit forming means 20a, 20b and 20c which are operated in cooperation with each of those switching elements 18a, 18b and 18c.

Each of those exciting circuit forming means 20a, 20b and 20c is comprised of the same parts, respectively. Now will be described below construction of the exciting circuit forming means 20a for controlling the change-over to hard mode (H).

As shown in FIG. 4, the exciting circuit forming means 20a is provided with a diode 100a whose anode side terminal is connected in series to the first switching element 18a corresponding to the hard mode (H) and whose cathode side terminal is connected to the first coil terminal 15a. During the first switching element 18a is selected, the diode 100a supplies electricity through the switching element 18a and the diode 100a itself to the first coil terminal 15a. And on the other hand, during the first switching element 18a is OFF, that is, not being selected, and where either of the second or third switching element 18b or 18c is selected, the diode 100a prevents a predetermined duration electrifying circuit 21a as will be described later from unnecessary operation owing to a voltage flowing backward from another predetermined duration electrifying circuits 21b and 21c to the first coil terminal 15a. At the anode side of the diode 100a is further connected to a second diode 101a which transmits a selection signal of the first switching element 18a to the predetermined duration electrifying circuit 21a.

The predetermined duration electrifying circuit 21a is triggered in cooperation with the selection of the first switching element 18a and is provided with an output transistor 107a as a switching element for conducting electricity from the first coil terminal 15a to the second coil terminal 15b for a predetermined duration, and in addition to it, resistances 102a, 105a and 106a, a capacitor 103a and a diode 104a. Accordingly, in cooperation with the opening (OFF) to closing (ON) operation of the first switching element 18a, charging of the capacitor 103a is started, and by this terminal current, the aforementioned output transistor 107a is electrified for a predetermined duration.

A base of the output transistor 107a in the predetermined duration electrifying circuit 21a is connected to conducting inhibiting means 22a. The conducting inhibition means 22a is comprised of two diodes 108a and 109a being connected in parallel to each other, resistances 110a and 111a, and a transistor 112a. In the conducting inhibiting means 22a, during either of the second switching element 18b or the third switching element 18c is being selected, electricity is supplied to the transistor 112a to be electrified via either of the diode 108a or 109a from either of the second switching element 18a or third swithcing element 18c, so that any unnecessary exciting circuit is inhibited by compulsorily turning off the output transistor 107a of the predetermined duration electrifying circuit 21a and generation of inconvenience such as break-down caused by simultaneously turning on a plurality of output transistors 107a, 108a and 109a is prevented As shown in FIG. 4, assuming that selection of the change-over switch 18 is switched into the hard mode (H), that is, into the first switching element 18a for example, there is formed an exciting circuit from the first coil terminal 15a to the second coil terminal 15b by the exciting circuit change-over circuit 14 for a predetermined duration. During the predetermined duration, an electric current flows through the ignition switch 17, the fuse 16, the first switching element 18a of change-over switch 18, the diode 100a, the first coil terminal 15a, the first coil 8, the fourth coil 11, the fifth coil 12, the second coil 9, the second coil terminal 15b, and to the output transistor 107, in this order. Accordingly, the first salient pole portion 7a and the fourth salient pole portion 7d of the stator 7 become the N pole, and so do the second and the fifth salient pole portions the S pole.

Figure 5:
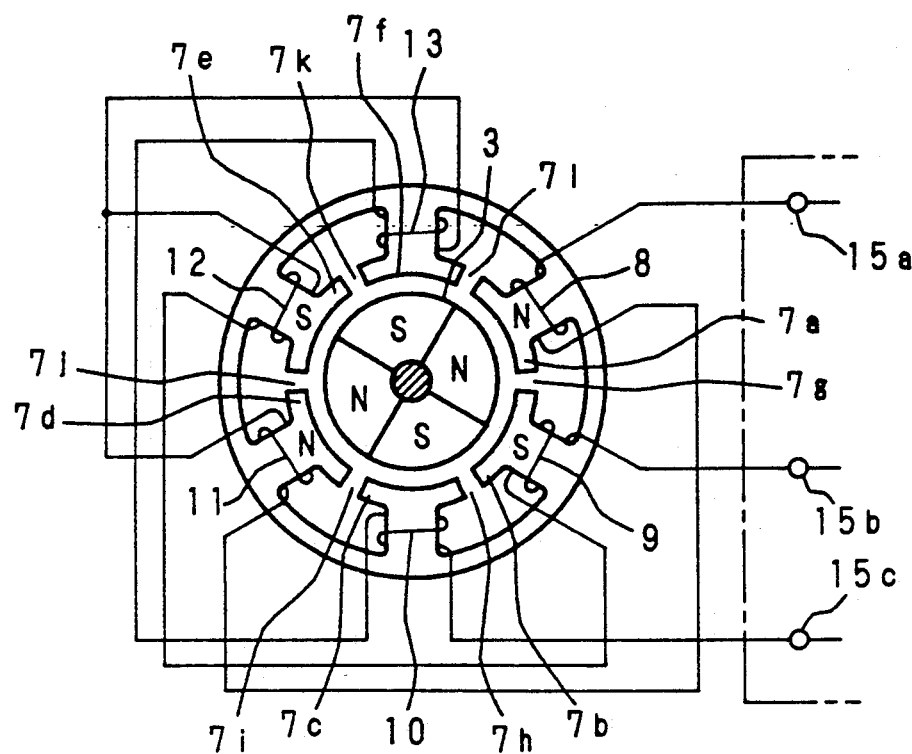
FIGS. 5 and 6 are schematic views for explaining operation of the controlling circuit.

At that time, assuming that switching from the soft mode (S) to hard mode (H) is executed and the magnetic pole of the permanent magnet 3 is in the rotational position first as shown in FIG. 5. The N poles of the first and fourth salient pole portions 7a, 7d repels the N pole of the permanent magnet 3, and the S poles of the second and fifth salient pole portions 7b, 7e attracts the N poles of the permanent magnet 3 and repels the S poles of the permanent magnet 3. As a result, a clockwise rotating torque is generated in the permanent magnet 3, by which the permanent magnet 3 itself and the rotating shaft 6 are rotated clock-wise to be integral with each other.

Figure 6:
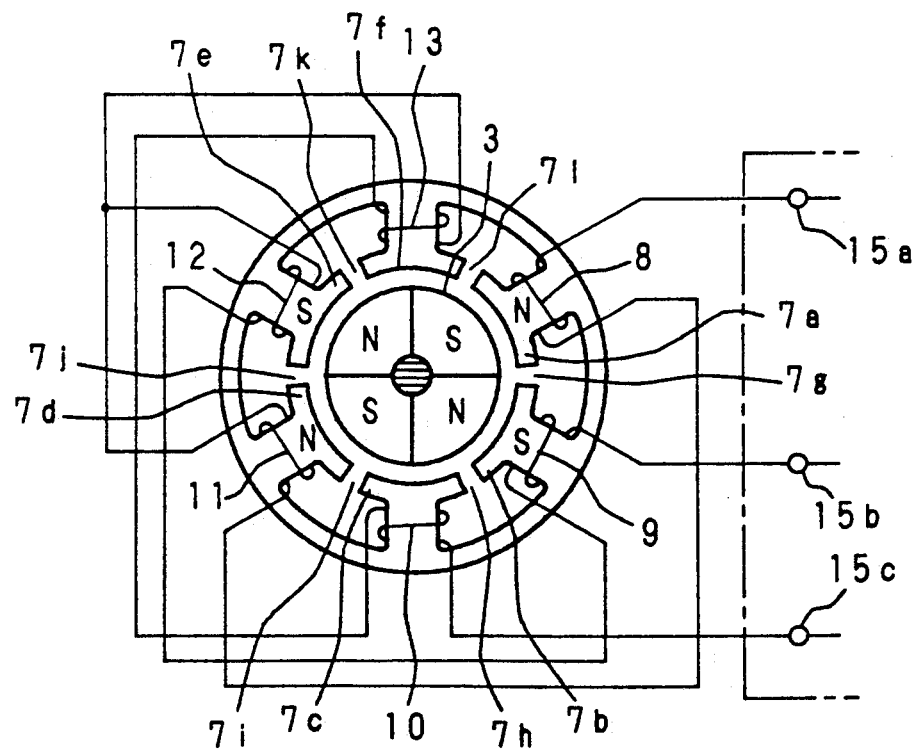

As shown in FIG. 6, in the position where the S poles of the permanent magnet 3 is positioned opposite to the N poles of the first and fourth salient pole portions 7a, 7d and the N poles of the permanent magnet 3 is positioned opposite to the S poles of the second and fifth salient pole portions 7b, 7e, the permanent magnet 3 is stopped by their suction.

At this time, when the permanent magnet 3 rotates too far by inertia, there is a portion in which the S poles of the permanent magnet 3 is positioned opposite to the S poles of the second and fifth salient pole portions 7b, 7e. By this resiliency generated between those S magnetic poles, there is generated a counterclockwise rotating torque in the permanent magnet 3, accordingly, the permanent magnet 3 rotates counterclockwise. And when the permanent magnet 3 rotates too far in the counterclockwise direction, the permanent magnet 3 takes repulsive magnetic fields of the first and fourth salient pole portions 7a, 7d.

As can be seen from the above description, correction force works so that a pole reverse portion of the permanent magnet 3 can be positioned opposite to the opening 7g being provided in between the first and second salient pole portions 7a and 7b of the stator 7 and the opening 7j being provided in between the fourth and fifth salient poles portions 7d and 7e.

Similarly, such switching as from the hard mode (H) to soft mode (S), the hard mode (H) to medium mode (M), and the medium mode (M) to hard mode (H) is carried out by the same operation as described above by each of the exciting circuit forming means 20c, 20b and 20a. As a result, the three-step manual change-over system of the damping force adjustable type hydraulic shock absorber can easily be realized by switching operation of the change-over switch 18 only.

In the aforementioned embodiment, there has been described the 60-rotational degree change-over type actuator for changing over the damping force adjustable type hydraulic shock absorbed, however, this invention is not limited to be used as that type of hydraulic shock absorber but can be arranged to be such types of a variety of change-over angles with electro-magnets whose number is three times of number of the polar pair of permanent magnet (one and half times of the number of pole) as a 120-degree change-over type with a permanent magnet whose number of polar pair is one (the number of pole is two) and three electro-magnets, or a 30-degree change-over type with a permanent magnet whose number of polar pair is four (the number of pole is eight) and twelve pieces of electro-magnet, both of which arrangement being applicable for a variety of usage.

In the aforementioned embodimnet, there has been described the actuator of inside permanent magnet rotary type, however, there may be employed an actuator of outer permanent magnet rotary type or an actuator of the type in which the permanent magnet is positioned to face the stator in the axial direction, by which can obtain the same effect as the aforementioned embodiment.

Furthermore in the aforementioned embodiment, there has been employed a mechanical switch as the change-over switch 18, however, similar effects can be obtained by employing an electronic switch with a transistor relay and the like. Similarly, as replacement of each of those output transistors 107a, 107b, and 107c, other electronic switches may be employed to have the same effect as the aforementioned embodiment.

In addition, in the aforementioned embodiment, the change-over switch 18 is provided at the side of earth, however, it may employ such arrangement as that a circuit is changed to be that of PNP complimentary and the change-over switch is provided at the side of earth and the output transistors are provided at the side of power source so as to obtain the same effect as the aforementioned embodiment.

Figure 7:
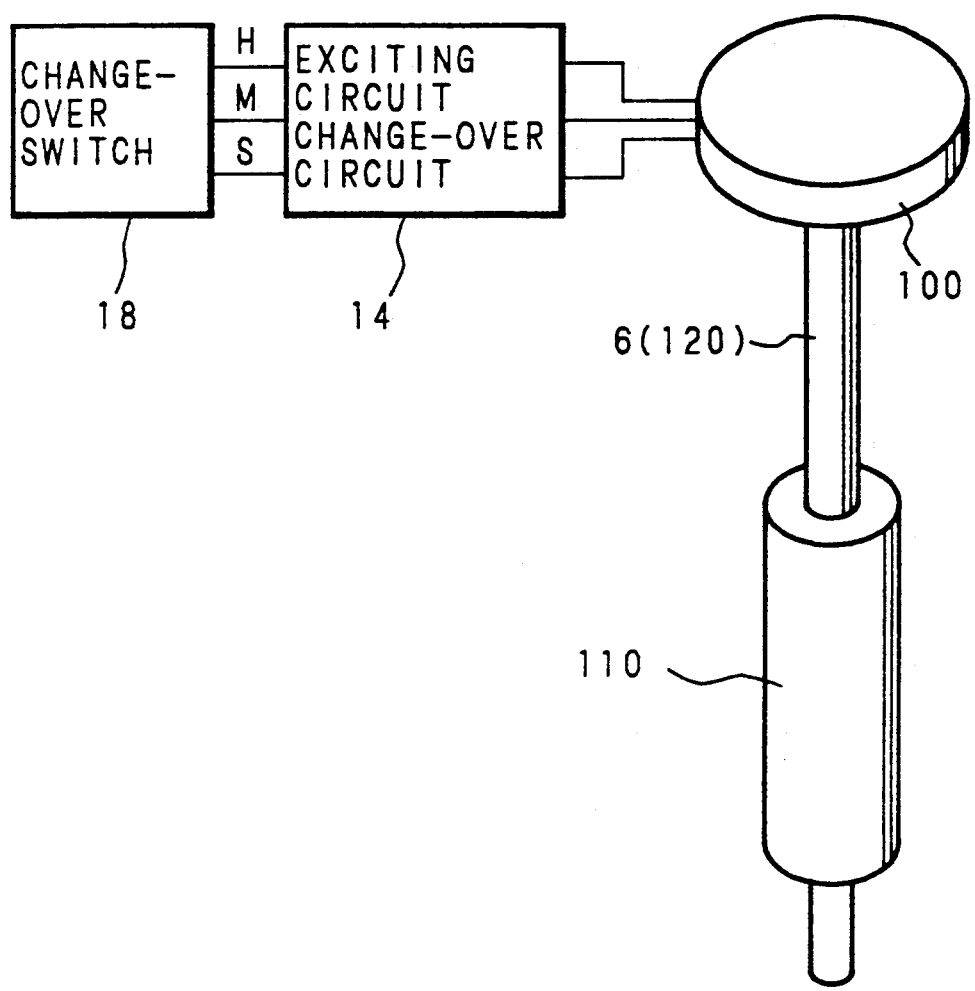
FIG. 7 is a schematic view showing a construction in the case where the controlling circuit for the actuator of the present invention is applied to a shock absorber.

FIG. 7 is a schematic diagram showing a construction in the case where the controlling circuit for the actuator of the present invention is applied to a damping force adjustable hydraulic shock absorber.

In FIG. 7, reference numerals 6, 14, 16, 17 and 18 are the above mentioned rotating shaft, exciting circuit change-over controlling circuit, fuse, ignition switch and change-over switch, respectively. A numeral 100 designates the actuator whose construction is shown in FIG. 1 and FIG. 2, and 110 designating a shock absorber.

The shock absorber 110 generates damping force by moving a piston which divides the cylinder filled by working oil into two portions. The shock absorber 110 is provided with a damping force varying mechanism which varies the damping force by controlling quantity of the working oil flowing between two portions in the cylinder, at the time when the piston moves in the cylinder.

A piston rod fixed to the piston is provided with a plurality of oil passages each of which has various area. The damping force varying mechanism is constructed so that one oil passage is selected by rotating the change-over shaft 210 which is connected to the rotating shaft 6 of the actuator 100.

As can be seen from the above description, according to the present invention, in the actuator in which the rotor is provided with a permanent magnet with a plurality of magnetic poles and a stator being positioned to face the rotor is provided with electro-magnets whose number are one and half times of the number of pole of said permanent magnet, the change-over switch of manual type is effectively used to change over electrifying so that magnetic fields for attracting the permanent magnet can be generated in each of the coils being arranged at the both sides of the opening of stator being positioned to face the polar reverse portion of permanent magnet in a desired stopping position after the permanent magnet has been rotated, and electricity is arranged to be supplied only for the predetermined duration and, then, is stopped, as a result, there can be obtained the controlling circuit for actuator for adjusting rotational position with greater accuracy in stopping rotational position without any unnecessary generation of heat. In addition to it, the diode is connected in between the change-over switch and the coil terminal of electro-magnet in order to prevent a voltage flowing backward from other exciting circuits and the like being generated because of unnecessary random operation of the change-over switch by the user, then, the stable operation of the controlling circuit can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A controlling circuit for an actuator which is provided with a rotating shaft to be stopped in each of a plurality of rotational positions, a rotor which is connected to said rotating shaft and in which the even number of magnetic poles of permanent magnet are arranged with equal interval, and a stator which is arranged to be positioned around said rotor and in which electro-magnets whose number is one and half times of the number of magnet poles of said permanent magnet are arranged with equal interval, comprising:

a change-over switch having a plurality of switching elements each of which corresponds to each of rotational position for designating each of rotational positions of said rotating shaft by selecting each of said switching element; and a plurality of exciting circuit forming means each of which is connected to each said switching element, respectively, and which forms an exciting circuit so that said plurality of electro-magnets is selectively magnetized in order to rotate said rotating shaft to be in a designated rotational position by connecting each of switching elements to a power source, wherein said each exciting circuit forming means comprises electrifying switching means for forming said exciting circuit for a predetermined duration from the time when switching elements to which each of themselves is connected have been connected to a power source.

2. A controlling circuit for an actuator as set forth in claim 1, wherein said each electrifying switching means comprises a capacitor which starts charging when each capacitor is connected to each of said magnetic field change over means, and a switching transistor which is made in a conducting state by terminal voltage of said capacitor.

3. A controlling circuit for an actuator as set forth in claim 1, wherein said each exciting circuit forming means has means, in it exciting circuit, for prohibiting current which flows backward from other exciting circuits.

4. A controlling circuit for an actuator as set forth in claim 3, wherein said means for prohibiting current is a diode.

5. A controlling circuit for an actuator as set forth in claim 1, wherein said each exciting circuit forming means is provided with detection means for detecting whether each switching element to which each of exciting circuit forming means are connected is cut off from a power source or not, and means for compulsorily making said electrifying switching means cut off when said detection means detects that the power source is cut off.

6. A controlling circuit of an actuator for a shock absorber which is provided with a rotating shaft being connected to a change-over shaft for changing-over oil passage area among a plurality of steps in order to vary a damping force of the shock absorber and to be stopped in each of a plurality of rotational positions, a rotor which is connected to said rotating shaft and in which the even number of magnetic poles of permanent magnet are arranged with equal interval, and a stator which is arranged to be positioned around said rotor and in which electro-magnets whose number is one and half times of the number of magnet poles of said permanent magnet are arranged with equal interval, comprising:

a change-over switch having a plurality of switching elements each of which corresponds to each of rotational position for designating each of rotational positions of said rotating shaft by selecting each of said switching element; and a plurality of exciting circuit forming means each of which is connected to each said switching element, respectively, and which forms an exciting circuit so that said plurality of electro-magnets is selectively magnetized in order to rotate said rotating shaft to be in a designated rotational position by connecting each of switching elements to a power source, wherein said each exciting circuit forming means comprises electrifying switching means for forming said exciting circuit for a predetermined duration from the time when switching elements to which each of themselves is connected have been connected to a power source.

7. A controlling circuit of an actuator for a shock absorber as set forth in claim 6, wherein said each electrifying switching means comprises a capacitor which starts charging when each capacitor is connected to each of said magnetic field change over means, and a switching transistor which is made in a conducting state by terminal voltage of said capacitor.

8. A controlling circuit of an actuator for a shock absorber as set forth in claim 6, wherein said each exciting circuit forming means has means, in it exciting circuit, for prohibiting current which flows backward from other exciting circuits.

9. A controlling circuit of an actuator for a shock absorber as set forth in claim 8, wherein said means for prohibiting current is a diode.

10. A controlling circuit of an actuator for a shock absorber as set forth in claim 6, wherein said each exciting circuit forming means is provided with detection means for detecting whether each switching element to which each of exciting circuit forming means are connected is cut off from a power source or not, and means for compulsorily making said electrifying switching means cut off when said detection means detects that the power source is cut off.

* * * * *